Sept. 8, 1959   R. F. LANGE   2,903,229
DEVICE FOR SUPPORTING A FRYING PAN IN TILTED POSITION
Filed Feb. 24, 1956
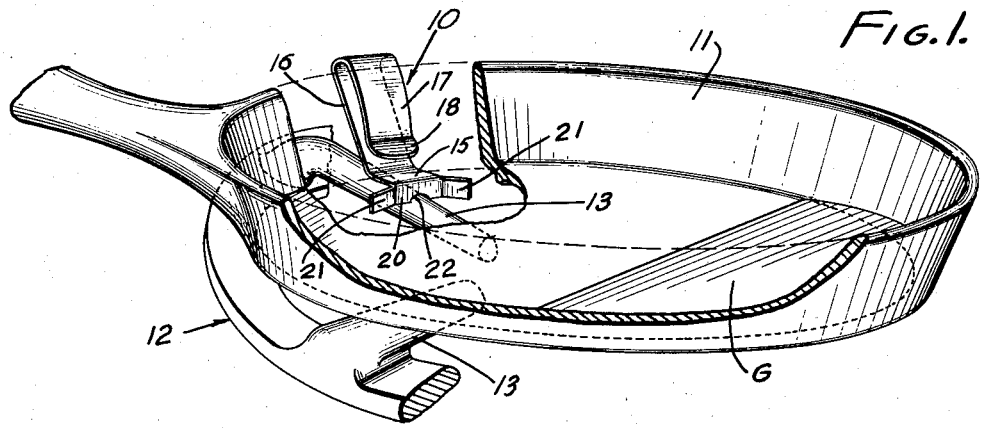
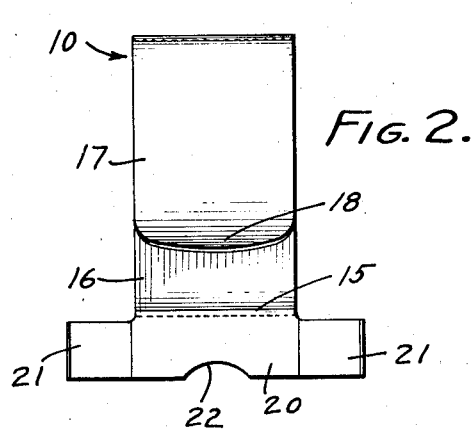
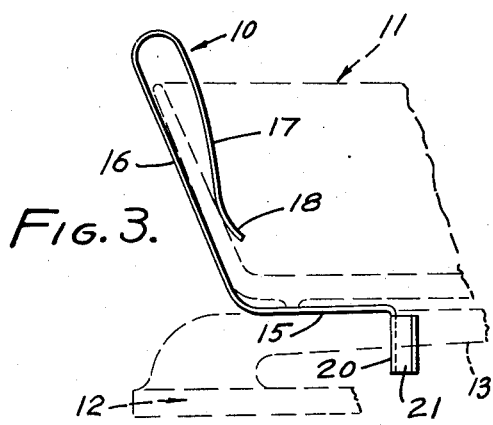
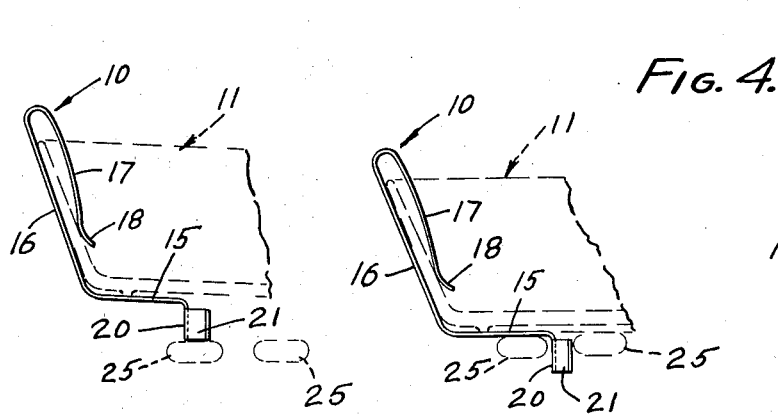
INVENTOR.
ROBERT F. LANGE
BY
N. Stevenson United States Patent Office 2,903,229
Patented Sept. 8, 1959

2,903,229

DEVICE FOR SUPPORTING A FRYING PAN IN TILTED POSITION

Robert F. Lange, Los Angeles, Calif.

Application February 24, 1956, Serial No. 567,669

1 Claim. (Cl. 248—359)

This invention relates generally to utensils in which various foods are cooked and is concerned particularly with frying pans, skillets and similar utensils in which meats are fried. Specifically, the invention pertains to means for use in connection with such a utensil and designed to facilitate separation and collecting of the fatty oils or grease rendered from meat during the frying process.

Certain foods, such as bacon, pork sausage, etc., contain considerably more fat and grease than is necessary to fry them in a skillet or other pan. During the frying process, it is common practice to drain off excess fat or grease at intervals in order to produce fried meat which is more appealing to the taste, easier to digest and more nourishing to the body. Health authorities agree that some of the vitamins and essential food elements of meat are present in the fat and thus are dissolved and carried away from the food when the latter is allowed to remain in contact with the fat or oil rendered from the meat for any period of time. When the fat is poured from the skillet, many of the valuable vitamins extracted from the meat are wasted.

The present invention is directed to a means for effecting continuous separation of the grease or oil from the food being fried in a skillet or like utensil so as to preclude the possibility of the food remaining in contact with the grease. It is therefore an object of this invention to provide a device which is so constructed and applied to use in connection with a frying pan that it functions to cause the oil or grease rendered from the fatty food to drain toward a side of the pan. Specifically, the present concept involves a device for maintaining the frying pan in a slightly inclined or sloping position during the frying of food so as to cause the rendered fat or oil to drain toward the lower side of the pan.

It has been proposed in the past to bring about this desired result by providing means for inclining the frying pan or broiler pan. Such means have been in the form of props either formed integrally with the pan or permanently connected thereto in which case the prop has been pivoted at a side of the pan for movement to an extended position to support the pan in a sloping condition or to a retracted position wherein the pan assumes a level condition. In either case, the pan-supporting means complicates manufacture of the pan and impairs the proper cleansing of the same. It is therefore another object of this invention to provide a frying pan support which is in the nature of an accessory or attachment for the pan, said support device being easily and quickly attached to the pan when fatty foods are to be fried and readily removed from the pan for cleaning.

Another object of the invention is to provide a frying pan support which takes the form of a sheet metal stamping having a spring clamp portion for gripping an edge of the frying pan and a base or foot portion underlying the pan and adapted to rest upon the burner grill or grate of the cooking stove to maintain the pan in a slightly tilted condition during the frying of fatty foods.

Another object of the invention is to provide a device of the type indicated in which the foot portion is so shaped that it may rest either upon one of the radial bars of a gas stove grill or upon one of the circular portions of the heating element of an electric cooking range.

A further object of the invention is to provide a device, of the character referred to, which is extremely simple in construction and adapted for economical mass production, the one-piece device being a single sheet metal stamping which is readily cleaned.

Further objects of the invention will appear from the following description and from the drawing which is intended for the purpose of illustration only, and in which:

Fig. 1 is a perspective view of a frying pan, showing my pan-tilting device applied to use therewith;

Fig. 2 is a face view of the device;

Fig. 3 is a side elevational view thereof;

Fig. 4 is a bottom view of the inner portion of the device; and

Figs. 5 and 6 are side elevational views of the device, illustrating how the device functions when the pan is being heated on the heating element of an electric range.

Referring to the drawing in detail, the present invention is directed to a pan tilting device 10 for use in tilting a frying pan, skillet 11 or similar pan in which foods are ordinarily fried upon the top burner of a cooking range. In conventional gas ranges, there is provided a removable grill 12 upon which the frying pan is supported above the gas burner (not shown). Said grill 12 has usual radially extending bars 13.

The pan-supporting and tilting device 10 is a simple stamping, preferably made from stainless steel sheet material. The device 10 includes a horizontal support portion 15 for underlying the bottom of the frying pan 11 at the peripheral portion thereof. At its outer end, the portion 15 is extended upwardly and outwardly in an inclined arm 16 which is intended to extend upwardly along the outwardly flared rim of the frying pan 11. The upper end portion of the arm 16 is folded back upon itself in a spring finger 17, the lower curved end 18 of which is engageable against the inner surface of the rim of the pan. The arm 16 and finger 17, 18 thus provide together a clamping means for engaging the outer and inner surfaces of the rim of the pan 11 to removably connect the device to the frying pan.

At its inner end, the support portion 15 is bent downwardly in a foot 20 which is of greater width than the support portion, the foot being either curved or having its ends deflected as shown at 21 in Fig. 4. At its central portion, the foot 20 has a curved recess or socket 22 formed in its lower edge.

Assuming that the frying pan or skillet 11 is to be used in frying fatty meat, such as bacon, the supporting and tilting device 10 is applied to the peripheral portion of the pan 11 by placing the clamp portion 16, 17 over the edge of the pan and pushing the device downwardly, during which time the support portion 15 is directed into place beneath the bottom of the pan.

With the device 10 applied to the frying pan 10 as explained above, and as illustrated in Figs. 1 and 3, the pan is ready for use. The pan 11 is placed on the grill 12 of the gas range and the foot 20 of the device 10 is caused to rest upon one of the radial bars 13 of the grill (Fig. 1). Thus, the frying pan 11 is tilted slightly so that during the frying of the fatty food, the grease or oil extracted from the food will flow toward the lower side of the pan as indicated at G in Fig. 1. Consequently, since the food is not immersed in its own oil during the frying process, it is rendered drier and more palatable and the need for subsequent drying on absorbent paper is avoided.

As will be observed from the above, the present device 10 is simply an attachment or accessory for mounting on the frying pan. When non-fatty foods are to be fried, it is unnecessary to tilt the pan and in such case, the pan is so placed on the grill 12 that the support 15 and foot 20 are located between a pair of the radial bars 13. When so positioned, the pan 11 is permitted to assume a normal horizontal position (Fig. 3).

When it is desired to remove the attachment 10 to facilitate cleaning both the pan and attachment, the device is detached by pulling the foot 20 outwardly and thereafter sliding the device upwardly to free the clamp 16, 17.

In the event that the frying pan 11 is to be supported by the device 10 in a slightly tilted position upon the top burner of an electric range, the pan is so placed on the burner that the foot 20 rests directly upon one of the circular rods 25 of the electric heating element, as shown in Fig. 5. When such tilting of the pan is unnecessary, the pan is so placed that the foot 20 enters a space between the rods 25 to allow the pan to assume the horizontal position shown in Fig. 6.

It will be observed from the foregoing that the present invention provides a very simple, yet highly practical and efficient means for tilting a frying pan or the like when the latter is placed upon the top burner of a gas or electric range. It is important to note that the present device is of a one-piece structure and is an attachment for a pan, the device being easily applied to and removed from the pan as desired. This is an improvement over prior art pan-tilting devices which consist either of lugs or the like formed integrally with the pan or elements pivotally connected to the pan. In the former case, the lugs complicate and increase the cost of manufacture of the pan, and in the later case the pan is rendered unsanitary due to the fact that it is almost impossible to thoroughly clean the pivoted elements.

In accordance with the provisions of the patent statutes, I have herein described the principle of the invention, together with the structure which I now consider to represent the best embodiment of the invention. I wish to have it understood, however, that various modifications might be made in the construction of the device without departing from the spirit or scope of the invention as defined in the appended claim.

I claim as my invention:

A unitary sheet metal device for use in tilting a frying pan, or the like, having a horizontally disposed bottom with flat top and bottom surfaces and a substantially vertically disposed, peripheral rim with inner and outer surfaces comprising: a resilient clamp portion engageable over the rim of the pan, a support portion engageable against the bottom of the pan and a foot portion to engage and rest upon a surface upon which the pan is placed, said clamp portion including an elongate, substantially vertically disposed arm to occur adjacent the outer surface of the rim of the pan and a downwardly turned, resilient finger at the upper end of the arm to engage the inner surface of the rim of the pan, said support portion including a flat, horizontally disposed, elongate projection on the lower end of the arm to engage the bottom surface of the pan and projecting radially inwardly from the periphery of the pan, said foot portion including, a downwardly turned, substantially vertically disposed projection on the inner end of the support portion having a straight, horizontally disposed bottom edge adapted to rest on a supporting surface and having laterally projecting stabilizer extensions at its opposite sides and angularly related thereto, said bottom edge of the foot having a downwardly opening recess therein to receive a portion of a cook stove grate.

References Cited in the file of this patent

UNITED STATES PATENTS

| 496,422 | Legon | May 2, 1893 |
| 784,803 | Moylan | Mar. 14, 1905 |
| 894,725 | Cooper | July 28, 1908 |

FOREIGN PATENTS

| 570,249 | Great Britain | June 28, 1945 |